United States Patent
Yim et al.

(10) Patent No.: US 12,065,524 B2
(45) Date of Patent: Aug. 20, 2024

(54) EPDM COPOLYMER AND METHOD OF PREPARING THE SAME

(71) Applicants: SK Innovation Co., Ltd., Seoul (KR); SK Geo Centric Co., Ltd., Seoul (KR)

(72) Inventors: Byoung Tak Yim, Daejeon (KR); Byung Jun Kim, Daejeon (KR); Jeong Hwan Kim, Daejeon (KR)

(73) Assignees: SK Innovation Co., Ltd., Seoul (KR); SK Geo Centric Co., Ltd, Seoul (KR)

( * ) Notice: Subject to any disclaimer, the term of this patent is extended or adjusted under 35 U.S.C. 154(b) by 89 days.

(21) Appl. No.: 17/825,122

(22) Filed: May 26, 2022

(65) Prior Publication Data

US 2022/0389140 A1 Dec. 8, 2022

(30) Foreign Application Priority Data

May 31, 2021 (KR) .................. 10-2021-0070279

(51) Int. Cl.
| | | |
|---|---|---|
| *C08F 210/18* | (2006.01) | |
| *C08F 4/52* | (2006.01) | |
| *C08F 4/68* | (2006.01) | |
| *C08K 3/013* | (2018.01) | |
| *C08K 3/04* | (2006.01) | |

(52) U.S. Cl.
CPC .............. *C08F 210/18* (2013.01); *C08F 4/52* (2013.01); *C08F 4/68* (2013.01); *C08K 3/013* (2018.01); *C08K 3/04* (2013.01)

(58) Field of Classification Search
CPC . C08F 210/18; C08F 4/52; C08F 4/68; C08K 3/013; C08K 3/04
See application file for complete search history.

(56) References Cited

U.S. PATENT DOCUMENTS

| | | | |
|---|---|---|---|
| 5,610,254 A | 3/1997 | Sagane et al. | |
| 5,837,791 A | 11/1998 | Sagane et al. | |
| 6,635,727 B1 | 10/2003 | Koda et al. | |
| 2002/0055445 A1 | 5/2002 | Okada et al. | |
| 2006/0106179 A1 | 5/2006 | Kim et al. | |

FOREIGN PATENT DOCUMENTS

| | | |
|---|---|---|
| KR | 100190430 B1 | 1/1999 |
| KR | 100353462 B1 | 1/2003 |
| KR | 100586922 B1 | 6/2006 |
| KR | 100615474 B1 | 8/2006 |
| KR | 100632822 B1 | 10/2006 |
| KR | 101776413 B1 | 9/2017 |
| KR | 102019825 B1 | 9/2019 |

*Primary Examiner* — Catherine S Branch
(74) *Attorney, Agent, or Firm* — The Webb Law Firm

(57) ABSTRACT

Provided are an ethylene-propylene-diene monomer (EPDM) copolymer and a method of preparing the same. An EPDM copolymer which has more improved miscibility with inorganic fillers such as carbon black, may further facilitate dispersibility in mixing to further decrease the viscosity of a compound composition, and may provide a compound composition having excellent processability and mechanical properties. A method of preparing the same is also provided.

19 Claims, No Drawings

EPDM COPOLYMER AND METHOD OF PREPARING THE SAME

CROSS-REFERENCE TO RELATED APPLICATION

This application claims priority to Korean Patent Application No. 10-2021-0070279 filed May 31, 2021, the disclosure of which is hereby incorporated by reference in its entirety.

BACKGROUND OF THE INVENTION

Field of the Invention

The following disclosure relates to an ethylene-propylene-diene monomer (EPDM) copolymer and a method of preparing the same. More particularly, the following disclosure relates to an EPDM copolymer which has more improved miscibility with inorganic fillers such as carbon black, may further facilitate dispersibility in mixing to further decrease the viscosity of a compound composition, and may provide a compound composition having excellent processability and mechanical properties, and a method of preparing the same.

Description of Related Art

An EPDM copolymer is a polymer prepared from ethylene, propylene, and diene comonomer, and as the diene, ethylidene norbornene (ENB), dicyclopentadiene (DCPD), vinyl norbornene (VNB), and the like are used.

The EPDM copolymer is a vulcanizable copolymer and shows physical properties such as excellent weatherability, heat resistance, and ozone resistance, and thus, is variously used in various rubber products, for example, automobile components, industrial rubber products, electrical insulation materials, civil engineering materials, construction materials, and the like.

In particular, in order to apply the EPDM copolymer to automobile components and the like, it is mixed with a large amount of an inorganic filler, more specifically carbon black and the like for providing excellent mechanical properties to be produced into a compound composition, and in order to show excellent processability and mechanical properties, miscibility between carbon black and the EPDM copolymer is very important. Though compound compositions are prepared under the same conditions, a mixing state with carbon black varies, and the viscosity and the mechanical properties of the compound composition vary, with the characteristics of the EPDM copolymer used.

Therefore, an EPDM copolymer having further improved wetting properties and miscibility with an inorganic filler such as carbon black is demanded.

RELATED ART DOCUMENTS

Patent Documents

Korean Patent Registration Publication No. 10-2019825 (Sep. 3, 2019)
Korean Patent Registration Publication No. 10-1776413 (Sep. 1, 2017)

SUMMARY OF THE INVENTION

An embodiment of the present invention is directed to providing an EPDM copolymer which has more improved wetting properties and miscibility with an inorganic filler such as carbon black to further improve dispersibility of the inorganic filler.

Another embodiment of the present invention is directed to providing an EPDM copolymer which, even in the case of including a large amount of the inorganic filler, improves processability since the viscosity of a compound composition is low, and provides a compound composition having excellent mechanical properties and moldability.

As a result of conducting a study for solving the above problems, it was found that by preparing an EPDM copolymer using a main catalyst prepared by a specific preparation method, wetting properties and miscibility of an inorganic filler such as carbon black may be further improved as intended above, and thus, the present invention was completed.

More specifically, it was found that a main catalyst hydrocarbon solution including a main catalyst prepared by reacting $VOCl_3$ and a C1-C7 alcohol in the presence of a hydrocarbon-based solvent is prepared, and then the main catalyst hydrocarbon solution is used as it is in a polymerization reaction without separating the main catalyst from the main catalyst hydrocarbon solution, thereby preparing the EPDM copolymer to be desired.

In addition, it was found that when a compound composition is prepared using the EPDM copolymer prepared by the above method, the compound composition has a lower Mooney viscosity and improved processability and moldability as compared with that using another EPDM copolymer which is not prepared by the preparation method.

In one general aspect, an EPDM copolymer satisfies the following conditions i) to iii):
  i) a Mooney viscosity (ML1+4) of 60 or more at 150° C.,
  ii) an ethylene (C2) content of 45 to 70 wt %, and
  iii) a Mooney viscosity (ML1+4) of 45 or less as measured at 100° C. under the following EPDM composition conditions:
    the EPDM composition conditions (of iii)) being mixing 72 parts by weight of carbon black, 60 parts by weight of a paraffin oil, 50 parts by weight of $CaCO_3$, 2 parts by weight of polyethylene glycol, 6 parts by weight of ZnO, and 2 parts by weight of a stearic acid, based on 100 parts by weight of the EPDM copolymer, at 50° C. at 60 rpm in a Banbury mixer.

In an embodiment, the EPDM composition conditions of iii) may be mixing 72 parts by weight of carbon black (N550), 60 parts by weight of a paraffin oil (MICHANG OIL IND. CO., LTD., P-6), 50 parts by weight of $CaCO_3$ (Dongho Calcium Company Inc., TL-1000), 2 parts by weight of polyethylene glycol (Dongnam Chemical Co., Ltd., MONOPOL PEG-4000), 6 parts by weight of ZnO (Hanil Chemical Ind. Co., Ltd., KS-1), and 2 parts by weight of a stearic acid (LG Household & Health Care Ltd., PH-100), based on 100 parts by weight of the EPDM copolymer at 50° C. at 60 rpm in a Banbury mixer.

In an embodiment, the EPDM copolymer may have a modulus of 350 kpa or less at a strain of 0.1%.

In an embodiment, the EPDM copolymer may have an ethylene (C2) content of 50 to 65 wt %.

In an embodiment, the EPDM copolymer may have a Mooney relaxation area (MLRA) of 900 to 1300.

In an embodiment, the EPDM composition may have a Mooney relaxation area (MLRA) of 380 to 500.

In an embodiment, the EPDM copolymer may have an ethylidene norbornene (ENB) content of 8 to 10 wt %.

In an embodiment, the EPDM copolymer may be polymerized using a main catalyst of the following Chemical Formula 1 and any one or two or more cocatalysts selected from an organic aluminum compound of the following Chemical Formula 2:

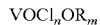

$VOCl_nOR_m$     [Chemical Formula 1]

wherein n+m=3 and 1<n<2, and
R is C1-C7 alkyl,

$R^1{}_nAlX_{3-n}$     [Chemical Formula 2]

wherein $R^1$ is a hydrocarbon group having 1 to 12 carbon atoms, X is a halogen atom or a hydrogen atom, and n is 1 to 3.

In an embodiment, the cocatalyst may be any one or a mixture of two or more selected from ethylaluminum sesquichloride (EASC), diethylaluminum chloride (DEAC), ethylaluminum dichloride (EADC), and the like.

In an embodiment, the main catalyst of Chemical Formula 1 may be characterized in that a main catalyst hydrocarbon solution prepared by reacting $VOCl_3$ and a C1-C7 alcohol in the presence of a hydrocarbon-based solvent is used as it is in a polymerization reaction without separating the main catalyst of the following Chemical Formula 1 from the main catalyst hydrocarbon solution:

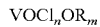

$VOCl_nOR_m$     [Chemical Formula 1]

wherein n+m=3 and 1<n<2, and
R is C1-C7 alkyl.

In an embodiment, an introduction ratio of the $VOCl_3$ and the C1-C7 alcohol may be 1:1.5-2.5 at a mole ratio.

In an embodiment, the hydrocarbon-based solvent may be any one or two or more solvents selected from pentane, hexane, heptane, octane, and the like.

In an embodiment, the cocatalyst may be ethylaluminum sesquichloride (EASC).

In another general aspect, a method of preparing an EPDM copolymer includes: a) reacting $VOCl_3$ and a C1-C7 alcohol in the presence of a hydrocarbon-based solvent to prepare a main catalyst hydrocarbon solution including a main catalyst of the following Chemical Formula 1:

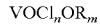

$VOCl_nOR_m$     [Chemical Formula 1]

wherein n+m=3 and 1<n<2, and
R is C1-C7 alkyl, b) performing first polymerization by introducing the main catalyst hydrocarbon solution as it is without separating a compound of Chemical Formula 1 from the main catalyst hydrocarbon solution in a), a cocatalyst, ethylene, propylene, and an ENB monomer to a first reactor and performing polymerization; and c) performing second polymerization by transferring a polymerization solution polymerized in the first polymerization to a second reactor, further introducing the ethylene and the ENB monomer, and introducing the main catalyst hydrocarbon solution of a) and the cocatalyst to the reactor and performing polymerization.

In an embodiment, an introduction ratio of $VOCl_3$ and the C1-C7 alcohol in a) may be 1:1.5-2.5 at a mole ratio.

In an embodiment, in the method of preparing an EPDM copolymer, the EPDM copolymer may satisfy the following conditions i) to iii):
i) a Mooney viscosity (ML1+4) of 60 or more at 150° C.,
ii) an ethylene (C2) content of 45 to 70 wt %, and
iii) a Mooney viscosity (ML1+4) of 45 or less as measured at 100° C. under the following EPDM composition conditions:

the EPDM composition conditions (of iii)) being mixing 72 parts by weight of carbon black, 60 parts by weight of a paraffin oil, 50 parts by weight of $CaCO_3$, 2 parts by weight of polyethylene glycol, 6 parts by weight of ZnO, and 2 parts by weight of a stearic acid, based on 100 parts by weight of the EPDM copolymer, at 50° C. at 60 rpm in a Banbury mixer.

In an embodiment, the EPDM composition conditions of iii) may be mixing 72 parts by weight of carbon black (N550), 60 parts by weight of a paraffin oil (MICHANG OIL IND. CO., LTD., P-6), 50 parts by weight of $CaCO_3$ (Dongho Calcium Company Inc., TL-1000), 2 parts by weight of polyethylene glycol (Dongnam Chemical Co., Ltd., MONOPOL PEG-4000), 6 parts by weight of ZnO (Hanil Chemical Ind. Co., Ltd., KS-1), and 2 parts by weight of a stearic acid (LG Household & Health Care Ltd., PH-100), based on 100 parts by weight of the EPDM copolymer at 50° C. at 60 rpm in a Banbury mixer.

In an embodiment, the first polymerization may be performed at 40 to 50° C. for 20 to 60 minutes, and the second polymerization may be performed at 40 to 50° C. for 10 to 30 minutes.

In an embodiment, a content of the main catalyst hydrocarbon solution introduced to the first polymerization may be 0.01 to 0.5 parts by weight and a content of the cocatalyst may be 1 to 3 parts by weight, based on 100 parts by weight of a total monomer content introduced to the first polymerization, and the content of the main catalyst hydrocarbon solution and the cocatalyst in the second polymerization may be 40 to 70 wt % of the content used in the first polymerization.

In still another general aspect, a compound composition includes the EPDM copolymer according to an embodiment of the present invention and an inorganic filler.

In an embodiment, the inorganic filler may include carbon black.

In an embodiment, the compound composition may include 60 parts by weight or more of the inorganic filler, based on 100 parts by weight of the EPDM copolymer.

In an embodiment, the compound composition may have a Mooney viscosity (ML1+4) of 45 or less as measured at 100° C.

Other features and aspects will be apparent from the following detailed description, the drawings, and the claims.

DESCRIPTION OF THE INVENTION

Hereinafter, the present invention will be described in more detail. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

An embodiment of the present invention provides an EPDM copolymer satisfying the following conditions i) to iii):

i) a Mooney viscosity (ML1+4) of 60 or more at 150° C.,
ii) an ethylene (C2) content of 45 to 70 wt %, and
iii) a Mooney viscosity (ML1+4) of 45 or less as measured at 100° C. under the following EPDM composition conditions:

the EPDM composition conditions (of iii)) being mixing 72 parts by weight of carbon black, 60 parts by weight of a paraffin oil, 50 parts by weight of CaCO₃, 2 parts by weight of polyethylene glycol, 6 parts by weight of ZnO, and 2 parts by weight of a stearic acid, based on 100 parts by weight of the EPDM copolymer, at 50° C. at 60 rpm in a Banbury mixer.

A commonly commercialized EPDM copolymer has a Mooney viscosity (ML1+4) of more than 45 as measured at 100° C. under the conditions of the EPDM composition described above, but the EPDM copolymer according to the present invention satisfies the physical property of 45 or less and provides and effect of improving dispersibility of carbon black. The conditions of preparing the EPDM composition will be described in more detail in the examples described later.

More specifically, the EPDM composition conditions of iii) may be mixing 72 parts by weight of carbon black (N550), 60 parts by weight of a paraffin oil (MICHANG OIL IND. CO., LTD., P-6), 50 parts by weight of CaCO₃ (Dongho Calcium Company Inc., TL-1000), 2 parts by weight of polyethylene glycol (Dongnam Chemical Co., Ltd., MONOPOL PEG-4000), 6 parts by weight of ZnO (Hanil Chemical Ind. Co., Ltd., KS-1), and 2 parts by weight of a stearic acid (LG Household & Health Care Ltd., PH-100), based on 100 parts by weight of the EPDM copolymer at 50° C. at 60 rpm in a Banbury mixer.

It was found that the EPDM copolymer according to an embodiment of the present invention may further improve the wetting properties and the miscibility of the inorganic filler, as intended, in the range satisfying all of the conditions i) to iii), and thus, the present invention was completed.

When the EPDM copolymer has a Mooney viscosity (ML1+4) of less than 60 at 150° C., it has low mechanical properties of filler filling rate or blending vulcanization molding, so that it may be used only for a limited use. Further, when the Mooney viscosity is excessively high, there may be a problem in blending and molding. The EPDM copolymer may have a Mooney viscosity (ML1+4) of, more specifically 60 to 70, and still more specifically 62 to 68 at 150° C.

The EPDM copolymer may have an ethylene (C2) content of 45 to 70 wt %, more specifically 50 to 65 wt %, and still more specifically 55 to 60 wt %, and within the range, an EPDM copolymer having excellent processability may be provided.

The EPDM copolymer may have an ethylidene norbornene (ENB) content of 8 to 10 wt %, more specifically 8.5 to 9.5 wt %. Within the range, a copolymer having a high crosslinking rate and excellent mechanical properties and processability may be provided.

The EPDM copolymer may have a Mooney relaxation area (MLRA) of 900 to 1300, and more specifically 950 to 1250.

In addition, the Mooney relaxation area (MLRA) may satisfy 380 to 500, and more specifically 400 to 490 under the conditions of the EPDM composition using the EPDM copolymer. This is low as compared with more than 500 of a composition identically prepared using a common EPDM copolymer. Accordingly, a compound composition having more improved processability and miscibility may be prepared.

The EPDM copolymer may have a modulus of 350 kpa or less, and more specifically 250 to 350 kpa at a strain of 0.1%. This is in a range being lower by 10 kpa or more than a common EPDM copolymer, and it is recognized that an EPDM copolymer having excellent mechanical properties and moldability may be provided.

Next, a method of preparing the EPDM copolymer according to an embodiment of the present invention will be described in more detail.

The EPDM copolymer according to an embodiment of the present invention is characterized by being polymerized using a main catalyst of the following Chemical Formula 1 and any one or two or more cocatalysts selected from an organic aluminum compound of the following Chemical Formula 2:

$$VOCl_nOR_m \qquad \text{[Chemical Formula 1]}$$

wherein n+m=3 and 1<n<2, and
R is C1-C7 alkyl,

$$R^1{}_nAlX_{3-n} \qquad \text{[Chemical Formula 2]}$$

wherein $R^1$ is a hydrocarbon group having 1 to 12 carbon atoms, X is a halogen atom or a hydrogen atom, and n is 1 to 3.

More specifically, the main catalyst of Chemical Formula 1 is characterized in that a main catalyst hydrocarbon solution prepared by reacting VOCl₃ and a C1-C7 alcohol in the presence of a hydrocarbon-based solvent is used as it is in a polymerization reaction without separating the main catalyst of Chemical Formula 1 from the main catalyst hydrocarbon solution. That is, HCl is produced as a by-product by the reaction of VOCl₃ and the C1-C7 alcohol and is present in a hydrocarbon solution, and the main catalyst hydrocarbon solution including HCl is introduced to the reaction as it is.

HCl present in the main catalyst solution changes the characteristics of a polymer produced from $VOCl_nOR_m$ of Chemical Formula 1, and the main catalyst hydrocarbon solution of the reactant as it is including the compound represented by Chemical Formula 1 as a main catalyst is used, thereby preparing the EPDM copolymer satisfying all of conditions i) to iii) described above.

In addition, as compared with the case of using the compound represented by Chemical Formula 1 alone as a main catalyst, when the main catalyst hydrocarbon solution of the reactant as it is including the compound represented by Chemical Formula 1 as a main catalyst as in the present invention is used, the EPDM copolymer satisfying all of the conditions i) to iii) described above may be prepared.

In addition, the EPDM copolymer prepared as such has better wetting properties and dispersibility of carbon black, and has excellent miscibility, and thus, when a compound composition is prepared, a composition having a low viscosity and excellent miscibility, and thus, having better moldability and processability may be prepared. Accordingly, an effect in which the product has excellent mechanical properties and elasticity to have improved productivity may be provided.

The main catalyst is, more specifically, the compound of Chemical Formula 1 produced by the reaction of VOCl₃ and the C1-C7 alcohol in the presence of a hydrocarbon-based solvent. Here, HCl is produced as a by-product and is included in the main catalyst hydrocarbon solution, and the compound represented by Chemical Formula 1 and HCl are used as it is in the state of being dissolved in the hydrocarbon-based solvent without being removed therefrom. As such, by using the hydrocarbon-based solvent in the state of including HCl, an EPDM copolymer, which has improved solubility in the hydrocarbon-based solvent as compared with the case of using the compound of Chemical Formula 1 alone in the activation state of the main catalyst hydrocarbon solution, adjusts a branch degree of the EPDM copolymer, and satisfies physical properties to be desired, may be prepared.

    [Chemical Formula 1]

wherein n+m=3 and 1<n<2, and

R is C1-C7 alkyl,

More specifically, in Chemical Formula 1, R may be C1-C4 alkyl, and more specifically, ethyl.

An introduction ratio of the VOCl₃ and the C1-C7 alcohol may be 1:1.5 to 2.5, more specifically 1.6 to 2.3, and more specifically 1.8 to 2.0 at a mole ratio.

The hydrocarbon-based solvent may be any one or two or more solvents selected from pentane, hexane, heptane, and octane, and more preferably, may be hexane.

The cocatalyst may be any one or two or more selected from the organic aluminum compound represented by Chemical Formula 2, and more specifically, for example, in Chemical Formula 2, $R^1$ is a hydrocarbon group having 1 to 12 carbon atoms, for example, an alkyl group, a cycloalkyl group, or an aryl group, and specifically, for example, is selected from a methyl group, an ethyl group, an n-propyl group, an isopropyl group, an isobutyl group, a pentyl group, a hexyl group, an octyl group, a cyclopentyl group, a cyclohexyl group, a phenyl group, a tolyl group, and the like.

A specific example of the organic aluminum compound as such may include trialkylaluminum such as trimethylaluminum, triethylaluminum, triisopropylaluminum, triisobutylaluminum, trioctylaluminum, and tri-2-ethylhexylaluminum; alkenylaluminum such as isoprenylaluminum; dialkylaluminum halide such as dimethylaluminum chloride, diethylaluminum chloride, diisopropylaluminum chloride, diisobutylaluminum chloride, and dimethylaluminum bromide; alkylaluminum sesquihalide such as methylaluminum sesquichloride, ethylaluminum sesquichloride, isopropylaluminum sesquichloride, butylaluminum sesquichloride, and ethylaluminum sesquibromide; alkylaluminum dihalide such as methylaluminum dichloride, ethylaluminum dichloride, isopropylaluminum dichloride, and ethylaluminum dibromide; alkylaluminum hydride such as diethylaluminumhydride and diisobutylaluminumhydride, and the like.

More specifically, the organic aluminum compound may be any one or a mixture of two or more selected from ethylaluminum sesquichloride (EASC), diethylaluminum chloride (DEAC), and ethylaluminum dichloride (EADC), and more specifically, may be ethylaluminum sesquichloride (EASC).

The method of preparing an EPDM copolymer of the present invention may be, first preparing a main catalyst hydrocarbon solution in a separate reactor, and then adding monomers of ethylene, propylene and diene, the main catalyst hydrocarbon solution, and a cocatalyst to another reactor or the same reactor to perform a reaction.

Otherwise, the method may be preparing the main catalyst hydrocarbon solution in a reactor, mixing a cocatalyst therewith, and adding monomers of ethylene, propylene and diene to perform a reaction.

In addition, it is possible to react VOCl₃ and a C1-C7 alcohol in the state of including a cocatalyst in the preparation of the main catalyst hydrocarbon solution.

More specifically, the polymerization reaction is adjusted in two steps, thereby allowing finer adjustment of the content of ethylene and ENB, which is more advantageous for preparing a copolymer having a Mooney viscosity and a Mooney relaxation area (MLRA) adjusted to the range to be desired, and thus, is preferred.

Specifically, as an example, the method may include:
a) reacting VOCl₃ and a C1-C7 alcohol in the presence of a hydrocarbon-based solvent to prepare a main catalyst hydrocarbon solution including a main catalyst of the following Chemical Formula 1:

    [Chemical Formula 1]

wherein n+m=3 and 1<n<2, and

R is C1-C7 alkyl, b) performing first polymerization by introducing the main catalyst hydrocarbon solution as it is without separating a compound of Chemical Formula 1 from the main catalyst hydrocarbon solution in a), a cocatalyst, ethylene, propylene, and an ENB monomer to a first reactor and performing polymerization; and c) performing second polymerization by transferring a polymerization solution polymerized in the first polymerization to a second reactor, further introducing the ethylene and the ENB monomer, and introducing the main catalyst hydrocarbon solution of a) and the cocatalyst to the reactor and performing polymerization.

In a), an introduction ratio of VOCl₃ and the C1-C7 alcohol may be 1:1.5 to 2.5, more specifically 1.6 to 2.3, and more specifically 1.8 to 2.0 at a mole ratio. Within the range, an acidity in the main catalyst hydrocarbon solution is adjusted to adjust the branch degree of the EPDM copolymer, thereby preparing the EPDM copolymer satisfying the physical properties to be desired. It is preferred that the step a) is performed in a separate reactor.

The first polymerization may be performed at 40 to 50° C. for 10 to 90 minutes, more specifically for 20 to 60 minutes, and the second polymerization may be performed at 40 to 50° C. for 5 to 60 minutes, more specifically for 10 to 30 minutes.

The content of the main catalyst hydrocarbon solution introduced to the first polymerization may be 0.01 to 0.5 parts by weight, more specifically 0.05 to 0.4 parts by weight, and the content of the cocatalyst may be 1 to 3 parts by weight, more specifically 1.2 to 2.8 parts by weight, based on 100 parts by weight of the total content of the monomers introduced to the first polymerization.

The content of the main catalyst hydrocarbon solution and the cocatalyst in the second polymerization may be 40 to 70 wt %, more specifically 45 to 65 wt % of the content used in the first polymerization.

In addition, the content of ethylene and ENB monomer added in the second polymerization may be 40 to 60 wt %, more specifically 40 to 55 wt % of the content used in the first polymerization for further addition for reaction.

More specifically, in the first polymerization, 15 to 30 wt % of ethylene, 65 to 80 wt % of propylene, and 1 to 10 wt % of ENB may be used, and in the second polymerization, ethylene and ENB are further added and the main catalyst hydrocarbon solution and the cocatalyst are further added to adjust the content so that the ethylene content is 45 to 70 wt % and the ethylidene norbornene (ENB) content is 8 to 10 wt % in the final copolymer.

As the first reactor and the second reactor, a continuous-stirred tank reactor (CSTR) may be used, but the present invention is not limited thereto.

Next, a compound composition using the EPDM copolymer according to an embodiment of the present invention will be described.

The EPDM copolymer is characterized by having excellent miscibility with carbon black, as described above, and having a low viscosity of the composition. Specifically, the compound composition may provide the physical properties of a Mooney viscosity (ML1+4) measured at 100° C. of 45 or less.

More specifically, the compound composition according to an embodiment of the present invention may include the EPDM copolymer satisfying i) to iii) described above and the inorganic filler.

The inorganic filler is not limited as long as it is commonly used, and may include carbon black.

More specifically, the compound composition may include 60 parts by weight or more, more specifically 60 to 200 parts by weight of the inorganic filler, based on 100 parts by weight of the EPDM copolymer.

More specifically, the compound composition according to an embodiment may include the EPDM copolymer satisfying i) to iii) described above, carbon black having a nitrogen adsorption surface area of 42 m²/g as the inorganic filler, calcium carbonate ($CaCO_3$) having an average particle diameter of 1 to 2 μm, a paraffin oil (P-6) as a rubber softening agent, polyethylene glycol (PEG-4000), zinc oxide (ZnO) having an average particle diameter of 0.7 to 1.5 μm as a crosslinking activator, and a stearic acid.

In addition, any additive commonly used in the corresponding field may be used without limitation.

Hereinafter, the present invention will be described in more detail with reference to the Examples and Comparative Examples. However, the following Examples and Comparative Examples are only an example for describing the present invention in more detail, and do not limit the present invention in any way.

Hereinafter, the physical properties were measured as follows:

1) Mooney Viscosity (ML1+4)

MV2000 Mooney viscometer of Alpha technologies was used as a method of evaluating the viscosity of an EPDM rubber or a compounding body thereof, and L-TYPE Rotor was used. The measurement procedure was as follows. For measurement, two specimens having a width of (4 cm±0.5 cm)×a length of (4 cm±0.5 cm)×a thickness of 10 mm were made. The temperature was set depending on the measurement conditions, and when the temperature was reached and stabilized, the prepared samples were placed on and under the rotor of the equipment, and a polypropylene film was interposed between the sample and a plate for preventing adhesion to the plate. After mounting the sample, analysis was performed with 1 minute of preheating, a measurement temperature (100° C. or 150° C.), a test time of 4 minutes, and a decay time of 2 minutes. The Mooney viscosity (ML1+4) refers to a torque value at the time when L-type Rotor was used at a set temperature, the sample was mounted, preheating was performed, and the test was completed.

2) Mooney Relaxation Area (MLRA)

It is the results obtained in the same equipment as that used in the measurement of the Mooney viscosity, and the measurement procedure was the same. Mooney relaxation area (MLRA) corresponds to a Mooney relaxation curve area value at the time of decay during the experiment procedure with the experimental method for obtaining a degree data for the stress relaxation of the measurement sample.

3) Mooney Viscosity (ML1+4) of EPDM Composition

The EPDM composition was prepared as follows.

A Banbury type internal mixer having an internal capacity of 1.7 L available from Farrel Corporation was used and the amount of the composition introduced was designed with a filling rate of 70%. Before introducing the composition, the temperature of cooling water connected to equipment was set to 50° C. A rotor was operated at 60 rpm and metered EPDM was introduced. RAM was closed and stirring was performed for 30 minutes. RAM was opened, ½ of the remaining metered amount was added, RMA was closed, and mixing was performed for 1 minute. RAM was opened again, the remaining metered amount was added, RAM was closed, mixing was performed for 2 minutes, RMA was opened, and cleaning was performed for 20 seconds. RAM was lowered again, mixing was performed for 2 minutes, and a rubber compound was downwardly received. The rubber compound was drawn twice at a thickness of 2.2 mm with an 8 inch roll, and then the Mooney viscosity was measured at 100° C. The method of measuring the Mooney viscosity was the same as in 1), except that the temperature condition was 100° C.

The compound composition ratio of the EPDM composition was as follows.

TABLE 1

| Raw material name | Specific gravity | part by weight | Compounding amount (g) |
|---|---|---|---|
| EPDM | 0.86 | 100 | 480 |
| N550 (FEE) (carbon black) | 1.80 | 72 | 345.6 |
| P-6 (paraffin oil) | 0.9 | 60 | 288 |
| CaCO3 | 2.75 | 50 | 240 |
| PEG-4000 (polyethylene glycol) | 1.13 | 2 | 9.6 |
| ZnO | 5.6 | 6 | 28.8 |
| Stearic acid | 0.8 | 2 | 9.6 |
| Total | | 292 | 1401.6 |

EPDM: using each EPDM prepared in the examples and the comparative examples
Carbon black: Corax ® N550 (FEF),
Paraffin oil: P-6, MICHANG OIL IND. CO., LTD.
Calcium carbonate ($CaCO_3$): Dongho Calcium Company Inc., TL-1000, average particle diameter: 1.5 μm
Polyethylene glycol: Dongnam Chemical Co., Ltd., MONOPOL PEG-4000
Zinc oxide (ZnO): Hanil Chemical Ind. Co., Ltd., KS-1, average particle diameter: 0.7 to 1.5 μm
Stearic acid: LG Household & Health Care Ltd., PH-100

4) Modulus

A modulus of elasticity was measured using the EPDM compounding body as a sample, RPA2000 rheometer was used, and the experiment was performed according to the procedure of ASTM D8059. In the present patent, a shear elastic modulus (G') at 100° C. at a strain of 0.1% was selectively used among the strain sweep experimental data.

5) Ethylene (C2) Content

A thin specimen required for analysis of the ethylene content of EPDM was prepared by the following procedure. 50 mg of EPDM was placed between Teflon-coated polyimide films, preheating was performed at 120° C. for 3 minutes, compression was performed at 120° C. at 320 bar for 3 minutes, and compression release and cooling were performed to prepare a film sample. Ethylene content analysis followed the method of ASTM D 3900 TEST-D using FT-IR.

6) Ethylidene Norbornene (ENB) Content

A specimen required for the analysis of the ethylidene norbornene content in EPDM was prepared by the following procedure. 200 mg of EPDM was added to a mold having a size of 10×20×0.2 (mm in width×mm in length×mm in thickness), Teflon-coated polyimide films were placed above and below, preheating was performed at 120° C. for 3 minutes, compression was performed at 120° C. at 60 bar for 3 minutes, and compression release and cooling were performed to prepare a film sample. Ethylidene norbornene content analysis followed the method of ASTM D 6047 using FT-IR.

Example 1

In a polymerization reaction, polymerization was performed in a reactor No. 1, a polymerization solution was poured into a reactor No. 2, monomers and a catalyst were further supplied to the reactor No. 2 to proceed with the polymerization reaction, and then a procedure of a polymerization stop reaction, flashing, steam stripping, drying, and baling was followed.

A main catalyst hydrocarbon solution which was introduced as a main catalyst to the first reactor was reacted in a separate reactor, and then was used as it is in the reaction without a process of separating the main catalyst. Specifically, 74 kg/hr of $VOCl_3$ (6% hexane solution) and 2.13 kg/hr of ethanol were reacted for 1 minute in a separate reactor, and then $VOCl_2OEt$ was used as it is in a state of being dissolved in a reaction solution without a separate separation process to introduce the main catalyst hydrocarbon solution to the reactor.

First, 2888 kg/hr of ethylene, 10032 kg/hr of propylene, 412 kg/hr of ENB, 76.13 kg/hr of the main catalyst hydrocarbon solution, and 180 kg/hr of ethylaluminum sesquichloride (EASC) (10% hexane solution) as a cocatalyst were introduced to the first reactor. The polymerization reaction was performed at 45° C. for 40 minutes in a continuous-stirred tank reactor (CSTR), and the polymerization solution was transferred to a second reactor.

At this time, 1085 kg/hr of ethylene and 221 kg/hr of ENB were further introduced to the second reactor, 42 kg/hr of $VOCl_3$ (6% hexane solution) as a main catalyst and 1.2 kg/hr of ethanol were reacted for 1 minute in a separate reactor before introduction, $VOCl_2OEt$ was used in a state of being dissolved in the reaction solution without a separate separation process and introduced to the reactor as the main catalyst hydrocarbon solution, and 54 kg/hr of EASC (10% hexane solution) as a cocatalyst was added to the reactor. The polymerization reaction was performed at 47° C. for 20 minutes in CSTR.

The physical properties of the polymerized EPDM were measured, and are shown in the following Table 2.

Example 2

EPDM was prepared in the same manner as in Example 1, except that the content of the main catalyst was adjusted.

The main catalyst hydrocarbon solution and the cocatalyst added to the first reactor were 67 kg/hr of $VOCl_2OEt$ (6% hexane solution) prepared in the same manner as in Example 1 and 166 kg/hr of EASC (10% hexane solution) respectively, and as the main catalyst hydrocarbon solution and the cocatalyst added to the second reactor, 39 kg/hr of $VOCl_2OEt$ (6% hexane solution) and 50 kg/hr of EASC (10% hexane solution) were used respectively.

The physical properties of the EPDM were measured, and are shown in the following Table 2.

Example 3

EPDM was prepared in the same manner as in Example 1, except that the content of the main catalyst was adjusted.

The main catalyst hydrocarbon solution and the cocatalyst added to the first reactor were 64 kg/hr of $VOCl_2OEt$ (6% hexane solution) prepared in the same manner as in Example 1 and 154 kg/hr of EASC (10% hexane solution) respectively, and as the main catalyst hydrocarbon solution and the cocatalyst added to the second reactor, 37 kg/hr of $VOCl_2OEt$ (6% hexane solution) and 47 kg/hr of EASC (10% hexane solution) were used respectively.

The physical properties of the EPDM were measured, and are shown in the following Table 2.

Comparative Example 1

EPDM was prepared in the same manner as in Example 1, except that $VOCl_3$ was used instead of the main catalyst hydrocarbon solution as the main catalyst.

The physical properties of the EPDM were measured, and are shown in the following Table 2.

Comparative Example 2

KEP 2480 available from KUMHO POLYCHEM. was used as the EPDM rubber.

The physical properties of the EPDM were measured, and are shown in the following Table 2.

Comparative Example 3

Arlanxeo Keltan 9950C was used as the EPDM rubber.

The physical properties of the EPDM were measured, and are shown in the following Table 2.

TABLE 2

|  | Example 1 | Example 2 | Example 3 | Comparative Example 1 | Comparative Example 2 | Comparative Example 3 |
|---|---|---|---|---|---|---|
| ML1 + 4 @150° C. | 65.1 | 60.6 | 66.5 | 68.4 | 66.4 | 65.6 |
| MLRA | 1209 | 962 | 1032 | 977 | 970 | 655 |
| C2 (wt %) | 58.1 | 58.2 | 58.8 | 60 | 58.1 | 48.1 |
| ENB (wt %) | 8.5 | 9.1 | 9.0 | 9.2 | 8.9 | 9.0 |

In addition, after the EPDMs of the examples and the comparative examples were used to prepare the EPDM compositions as in 3), the physical properties were measured and are shown in the following Table 3.

TABLE 3

| | | Example 1 | Example 2 | Example 3 | Comparative Example 1 | Comparative Example 2 | Comparative Example 3 |
|---|---|---|---|---|---|---|---|
| Compound MV | ML1 + 4 MU 100° C. | 38.0 | 38.0 | 42.4 | 50.2 | 45.9 | 56.7 |
| | MLRA | 442 | 400 | 486 | 584 | 518 | 601 |

As seen in Table 3, it was confirmed that Examples 1 to 3 using the EPDM according to the present invention had the Mooney viscosity of the compound composition of 45 or less.

In addition, in the manufacture of a molded body, a molded body having better processability and moldability, and more improved mechanical properties was able to be manufactured.

The EPDM copolymer according to the present invention has excellent miscibility with an inorganic filler to further decrease the viscosity in the preparation of a compound composition and further improve the dispersity of an inorganic filler, so that it has better processability and mechanical properties.

More specifically, even when a content of carbon black is excessive, a compound composition which has improved dispersibility of carbon black and has a low viscosity to have moldability and processability may be provided.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. An ethylene-propylene-diene monomer (EPDM) copolymer satisfying the following conditions i) to iii):
   i) a Mooney viscosity (ML1+4) of 60 or more at 150° C.,
   ii) an ethylene (C2) content of 45 to 70 wt %, and
   iii) a Mooney viscosity (ML1+4) of 45 or less as measured at 100° ° C. under the following EPDM composition conditions:
   the EPDM composition conditions of iii) being mixing 72 parts by weight of carbon black, 60 parts by weight of a paraffin oil, 50 parts by weight of CaCO$_3$, 2 parts by weight of polyethylene glycol, 6 parts by weight of ZnO, and 2 parts by weight of a stearic acid, based on 100 parts by weight of the EPDM copolymer, at 50° C. at 60 rpm in a Banbury mixer.

2. The ethylene-propylene-diene monomer copolymer of claim 1, wherein the EPDM copolymer has a modulus of 350 kpa or less at a strain of 0.1%.

3. The ethylene-propylene-diene monomer copolymer of claim 1, wherein the EPDM copolymer has an ethylene (C2) content of 50 to 65 wt %.

4. The ethylene-propylene-diene monomer copolymer of claim 1, wherein the EPDM copolymer has a Mooney relaxation area (MLRA) of 900 to 1300.

5. The ethylene-propylene-diene monomer copolymer of claim 1, wherein the EPDM composition has a Mooney relaxation area (MLRA) of 380 to 500.

6. The ethylene-propylene-diene monomer copolymer of claim 1, wherein the EPDM copolymer has an ethylidene norbornene (ENB) content of 8 to 10 wt %.

7. The ethylene-propylene-diene monomer copolymer of claim 1, wherein the EPDM copolymer is polymerized by contacting monomers of ethylene, propylene, and diene with a main catalyst of the following Chemical Formula 1 and any one or two or more cocatalysts selected from an organic aluminum compound of the following Chemical Formula 2:

VOCl$_n$OR$_m$                              [Chemical Formula 1]

wherein n+m=3 and 1<n<2, and R is C1-C7 alkyl,

R$^1_n$AlX$_{3-n}$                              [Chemical Formula 2]

wherein R$^1$ is a hydrocarbon group having 1 to 12 carbon atoms, X is a halogen atom or a hydrogen atom, and n is 1 to 3.

8. The ethylene-propylene-diene monomer copolymer of claim 7, wherein the cocatalyst is any one or a mixture of two or more selected from ethylaluminum sesquichloride (EASC), diethylaluminum chloride (DEAC), and ethylaluminum dichloride (EADC).

9. The ethylene-propylene-diene monomer copolymer of claim 7, wherein the main catalyst of Chemical Formula 1 is present in a hydrocarbon solution prepared by reacting VOCl$_3$ and a C1-C7 alcohol in hydrocarbon-based solvent, and wherein the main catalyst of Chemical Formula 1 remains in the hydrocarbon solution during the polymerization reaction.

10. The ethylene-propylene-diene monomer copolymer of claim 9, wherein the VOCl$_3$ and the C1-C7 alcohol are reacted in a molar ratio of 1:1.5 to 2.5.

11. The ethylene-propylene-diene monomer copolymer of claim 9, wherein the hydrocarbon-based solvent is any one or two or more solvents selected from pentane, hexane, heptane, and octane.

12. The ethylene-propylene-diene monomer copolymer of claim 9, wherein the cocatalyst is ethylaluminum sesquichloride (EASC).

13. A method of preparing the ethylene-propylene-diene monomer copolymer of claim 1, the method comprising the steps of:
   a) reacting VOCl$_3$ and a C1-C7 alcohol in a hydrocarbon-based solvent to prepare a hydrocarbon solution including a main catalyst of the following Chemical Formula 1:

VOCl$_n$OR$_m$                              [Chemical Formula 1]

wherein n+m=3 and 1<n<2, and
R is C1-C7 alkyl,
- b) performing first polymerization by introducing the hydrocarbon solution including the main catalyst of Chemical Formula 1, wherein the main catalyst of Chemical Formula 1 remains in the hydrocarbon solution of step a), a cocatalyst, ethylene, propylene, and an ethylidene norbornene (ENB) monomer to a first reactor and performing polymerization; and
- c) performing second polymerization by transferring a polymerization solution polymerized in the first polymerization to a second reactor, further introducing the ethylene and the ENB monomer, and introducing the hydrocarbon solution including the main catalyst of Chemical Formula 1 of step a) and the cocatalyst to the reactor and performing polymerization.

14. The method of claim 13, wherein in step a), the $VOCl_3$ and the C1-C7 alcohol are reacted in a molar ratio of 1:1.5 to 2.5.

15. The method of claim 13, wherein the first polymerization is performed at 40 to 50° C. for 20 to 60 minutes, and the second polymerization is performed at 40 to 50° C. for 10 to 30 minutes.

16. The method of claim 13,
wherein a content of the hydrocarbon solution including the main catalyst of Chemical Formula 1 introduced to the first polymerization is 0.01 to 0.5 parts by weight and a content of the cocatalyst is 1 to 3 parts by weight, based on 100 parts by weight of a total monomer content introduced to the first polymerization, and
the content of the hydrocarbon solution including the main catalyst of Chemical Formula 1 and the cocatalyst in the second polymerization is 40 to 70 wt % of the content used in the first polymerization.

17. A compound composition comprising the ethylene-propylene-diene monomer copolymer of claim 1 and an inorganic filler.

18. The compound composition of claim 17, wherein the inorganic filler includes carbon black.

19. The compound composition of claim 17, wherein the compound composition includes 60 parts by weight or more of the inorganic filler, based on 100 parts by weight of the EPDM copolymer.

* * * * *

UNITED STATES PATENT AND TRADEMARK OFFICE
CERTIFICATE OF CORRECTION

PATENT NO. : 12,065,524 B2
APPLICATION NO. : 17/825122
DATED : August 20, 2024
INVENTOR(S) : Byoung Tak Yim et al.

It is certified that error appears in the above-identified patent and that said Letters Patent is hereby corrected as shown below:

In the Claims

Column 14, Line 45, In Claim 9, before "hydrocarbon-based" insert -- a --

Signed and Sealed this
Fifth Day of November, 2024

Katherine Kelly Vidal
Director of the United States Patent and Trademark Office